US007876896B2

(12) United States Patent
Alkove et al.

(10) Patent No.: US 7,876,896 B2
(45) Date of Patent: *Jan. 25, 2011

(54) RTP PAYLOAD FORMAT

(75) Inventors: James M. Alkove, Woodinville, WA (US); Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/360,099

(22) Filed: Jan. 26, 2009

(65) Prior Publication Data

US 2009/0135849 A1    May 28, 2009

Related U.S. Application Data

(63) Continuation of application No. 10/612,851, filed on Jul. 3, 2003, now Pat. No. 7,483,532.

(51) Int. Cl.
  *H04K 1/00*    (2006.01)
  *G06F 15/16*    (2006.01)
(52) U.S. Cl. ............................ 380/37; 713/168; 709/231
(58) Field of Classification Search .................... 380/37; 713/168; 709/231
See application file for complete search history.

(56) References Cited

U.S. PATENT DOCUMENTS

| | | | |
|---|---|---|---|
| 5,224,166 A | 6/1993 | Hartman, Jr. | |
| 6,134,243 A | 10/2000 | Jones et al. | |
| 6,205,140 B1 | 3/2001 | Putzolu et al. | |
| 6,278,478 B1 | 8/2001 | Ferriere | |
| 6,456,967 B1 * | 9/2002 | Yeom | ........................ 704/220 |
| 6,512,778 B1 | 1/2003 | Jones et al. | |
| 6,654,389 B1 | 11/2003 | Brunheroto et al. | |
| 6,700,895 B1 * | 3/2004 | Kroll | .......................... 370/412 |

(Continued)

FOREIGN PATENT DOCUMENTS

CN    1498479 A    5/2004

(Continued)

OTHER PUBLICATIONS

Curet, et al., "RTP Payload Format for MPEG-4 FexMultiplexed Streams", Internet Engineering Task Force, Internet Draft, XP-001075015, Nov. 8, 2001, 12 pages.

(Continued)

*Primary Examiner*—Kambiz Zand
*Assistant Examiner*—William S Powers
(74) *Attorney, Agent, or Firm*—Lee & Hayes, PLLC

(57) ABSTRACT

A data stream is encrypted to form encryption units that are packetized into RTP packets. Each RTP packet includes an RTP packet header, one or more payloads of a common data stream, and a RTP payload format header for each payload and including, for the corresponding encryption units, a boundary for the payload. The payload can be one or more of the encryption units or a fragment of one of the encryption units. The encryption units are reassembled the using the payloads in the RTP packets and the respective boundary in the respective RTP payload format header. The reassembled of encryption units are decrypted for rendering. Each RTP payload format header can have attributes for the corresponding payload that can be used to render the payload. The RTP packets can be sent server-to-client or peer-to-peer.

15 Claims, 6 Drawing Sheets

U.S. PATENT DOCUMENTS

| | | | |
|---|---|---|---|
| 6,856,997 B2 | 2/2005 | Lee et al. | |
| 6,918,034 B1 | 7/2005 | Sengodan et al. | |
| 6,944,296 B1 | 9/2005 | Liu et al. | |
| 6,965,646 B1* | 11/2005 | Firestone | 375/240.26 |
| 6,983,049 B2 | 1/2006 | Wee et al. | |
| 6,993,137 B2 | 1/2006 | Fransdonk | |
| 7,010,032 B1 | 3/2006 | Kikuchi et al. | |
| 7,080,043 B2 | 7/2006 | Chase, Jr. et al. | |
| 7,120,250 B2 | 10/2006 | Candelore | |
| 7,136,577 B1* | 11/2006 | Falco | 386/112 |
| 7,136,945 B2 | 11/2006 | Gibbs et al. | |
| 7,145,919 B2 | 12/2006 | Krishnarajah et al. | |
| 7,174,452 B2 | 2/2007 | Carr | |
| 7,243,366 B2 | 7/2007 | Medvinsky et al. | |
| 7,257,641 B1 | 8/2007 | VanBuskirk et al. | |
| 7,325,139 B2 | 1/2008 | Ishiguro et al. | |
| 7,346,160 B2 | 3/2008 | Michaelsen | |
| 7,536,418 B2 | 5/2009 | Buchsbaum et al. | |
| 2001/0052135 A1 | 12/2001 | Balakrishnan et al. | |
| 2002/0002674 A1 | 1/2002 | Grimes et al. | |
| 2002/0004773 A1 | 1/2002 | Xu et al. | |
| 2003/0041257 A1 | 2/2003 | Wee et al. | |
| 2003/0056118 A1 | 3/2003 | Troyansky et al. | |
| 2003/0081592 A1 | 5/2003 | Krishnarajah et al. | |
| 2003/0103243 A1 | 6/2003 | Watanabe et al. | |
| 2003/0131353 A1 | 7/2003 | Blom et al. | |
| 2003/0161473 A1 | 8/2003 | Fransdonk | |
| 2004/0042451 A1 | 3/2004 | Takaku | |
| 2004/0125757 A1 | 7/2004 | Mela et al. | |
| 2004/0125791 A1 | 7/2004 | Hoffmann | |
| 2004/0143736 A1 | 7/2004 | Cross et al. | |
| 2004/0249759 A1 | 12/2004 | Higashi et al. | |
| 2005/0002402 A1 | 1/2005 | Fairman | |
| 2005/0002525 A1 | 1/2005 | Alkove et al. | |
| 2005/0008240 A1 | 1/2005 | Banerji et al. | |
| 2005/0069039 A1 | 3/2005 | Crinon | |
| 2005/0099869 A1 | 5/2005 | Crinon et al. | |
| 2005/0108746 A1 | 5/2005 | Futagami et al. | |
| 2005/0144470 A1 | 6/2005 | Takashima et al. | |
| 2005/0157727 A1 | 7/2005 | Date et al. | |
| 2005/0163052 A1 | 7/2005 | Savage et al. | |
| 2005/0169303 A1 | 8/2005 | Toma et al. | |
| 2005/0169444 A1 | 8/2005 | Inon | |
| 2005/0177875 A1 | 8/2005 | Kamperman et al. | |
| 2005/0216413 A1 | 9/2005 | Murakami | |
| 2005/0254526 A1 | 11/2005 | Wang et al. | |
| 2005/0265555 A1 | 12/2005 | Pippuri | |
| 2006/0104356 A1 | 5/2006 | Crinon | |
| 2006/0130104 A1 | 6/2006 | Budagavi | |
| 2006/0161635 A1 | 7/2006 | Lamkin et al. | |
| 2006/0167985 A1 | 7/2006 | Albanese et al. | |
| 2006/0184790 A1 | 8/2006 | Oliveira et al. | |
| 2006/0262732 A1 | 11/2006 | Joutsenvirta et al. | |
| 2006/0268099 A1 | 11/2006 | Potrebic et al. | |
| 2006/0291475 A1 | 12/2006 | Cohen | |
| 2007/0003064 A1 | 1/2007 | Wiseman et al. | |
| 2007/0016594 A1 | 1/2007 | Visharam et al. | |
| 2007/0016784 A1 | 1/2007 | Vauclair | |
| 2007/0104105 A1 | 5/2007 | MeLampy et al. | |
| 2007/0106814 A1 | 5/2007 | Son et al. | |
| 2007/0171903 A1 | 7/2007 | Zeng et al. | |
| 2007/0248073 A1 | 10/2007 | Pattavina et al. | |
| 2007/0274393 A1 | 11/2007 | Toma et al. | |
| 2008/0052751 A1 | 2/2008 | Cromarty et al. | |
| 2008/0075168 A1 | 3/2008 | Toma et al. | |
| 2008/0126812 A1 | 5/2008 | Ahmed et al. | |
| 2008/0187284 A1 | 8/2008 | Ikeda et al. | |
| 2008/0216116 A1 | 9/2008 | Pekonen et al. | |

FOREIGN PATENT DOCUMENTS

| | | |
|---|---|---|
| CN | 1643474 A | 7/2005 |
| EP | 1041823 A2 | 10/2000 |
| EP | 1041823 A2 | 10/2000 |
| EP | 1271830 A2 | 1/2003 |
| EP | 1494425 A1 | 1/2005 |
| JP | 2000287192 A | 10/2000 |
| JP | 2002044135 A | 2/2002 |
| RU | 2144736 C1 | 1/2000 |
| RU | 2159507 C1 | 11/2000 |
| WO | WO0011849 A1 | 3/2000 |
| WO | WO0011849 A1 | 3/2000 |
| WO | WO0251096 A1 | 6/2002 |
| WO | WO03028293 A1 | 4/2003 |
| WO | WO2004023717 A2 | 3/2004 |
| WO | WO2004030364 A1 | 4/2004 |
| WO | WO2004097605 A1 | 11/2004 |

OTHER PUBLICATIONS

Handley, et al., "SDP: Session Description Protocol," The Internet Society, 1998, pp. 1-42.

Kim, "Design and Implementation of MPEG-2/DVB Scrambler Unit and VLSI Chip" 1997 International Conference on Consumer Electronics vol. 43 No. 3. pp. 320-321 Jun. 1997.

Klemets, "RTP Payload Format for Video Codec 1 (VC-1)," Microsoft, Feb. 2006, pp. 1-36.

Nafaa, et al., "RTP4MUX: A novel MPEG-4 RTP Payload for Multicast Video Communications over Wireless IP", IEEE-PV 2003, Apr. 28, 2003, 13th International Packet Video Workshop, availabe at <<http://www.prism.uvsq.fr/{anaf/nafaa_iscc03.pdf, 10 pages.

"Proposed SMPTE Standard for Television: VC-1 Compressed Video Bitstream Format and Decoding Process," The Society of Motion Picture and Television Engineers, Aug. 23, 2005, pp. 1-480.

"RTP Payload Format for MPEG-4 Streams," Internet Engineering Task Force, Internet Draft, XP-001033580, Jul. 2001, 41 pages.

"RTP Profile for Audio and Video Conferences with Minimal Control", RFC 1890, available at <<http://faqs.org/rfcs/rfc1890.html>>, accessed Jan. 7, 2004, 14 pages. Published, Jan. 1996.

Schulzrinne, et al., "RTP: A Transport Protocol for Real-Time Applications," The Internet Society, 2003, pp. 1-104. Published, Jan. 1996.

Search Report and Written Opinion in PCT/US2006/031185, date of mailing Jan. 16, 2007, pp. 12.

"SMPTE Standard for Television, Audio and Film—Time and Control Code", The Society of Motion Picture and Television Engineers, Sep. 12, 1995.

"Media Distribution Technique," NTT R&D, vol. 52, No. 1, Jan. 10, 2003 (English Abstract p. 1).

Nafaa, et al, "XP 002301132 RTTP4mux Novel MPEG-4 RTP Payload Multicast Video Communications over wireless IP".

Hoffman, et al., "RTP Payload Format for MPEG1/MPEG2 Video", Network Working Group, RFC 2250, Jan. 1998, pp. 1-16.

Won-Ho Kim, "Design and Implementation of MPEG-2/DVB Scrambler Unit and VLSI Chip" 1997 International Conference on Consumer Electronics vol. 43 No. 3. pp. 320-321 Jun. 1997.

Decision on Grant from the Russian Federation Patent Office for Application No. 2004120267/09(021893), mailed on May 27, 2009, 19 pgs.

Schulzrinne, et al., "RFC1889: A Transport Protocol for Real-Time Applications", Network Working Group Request for Comments, Jan. 1996, pp. 1-75.

\* cited by examiner

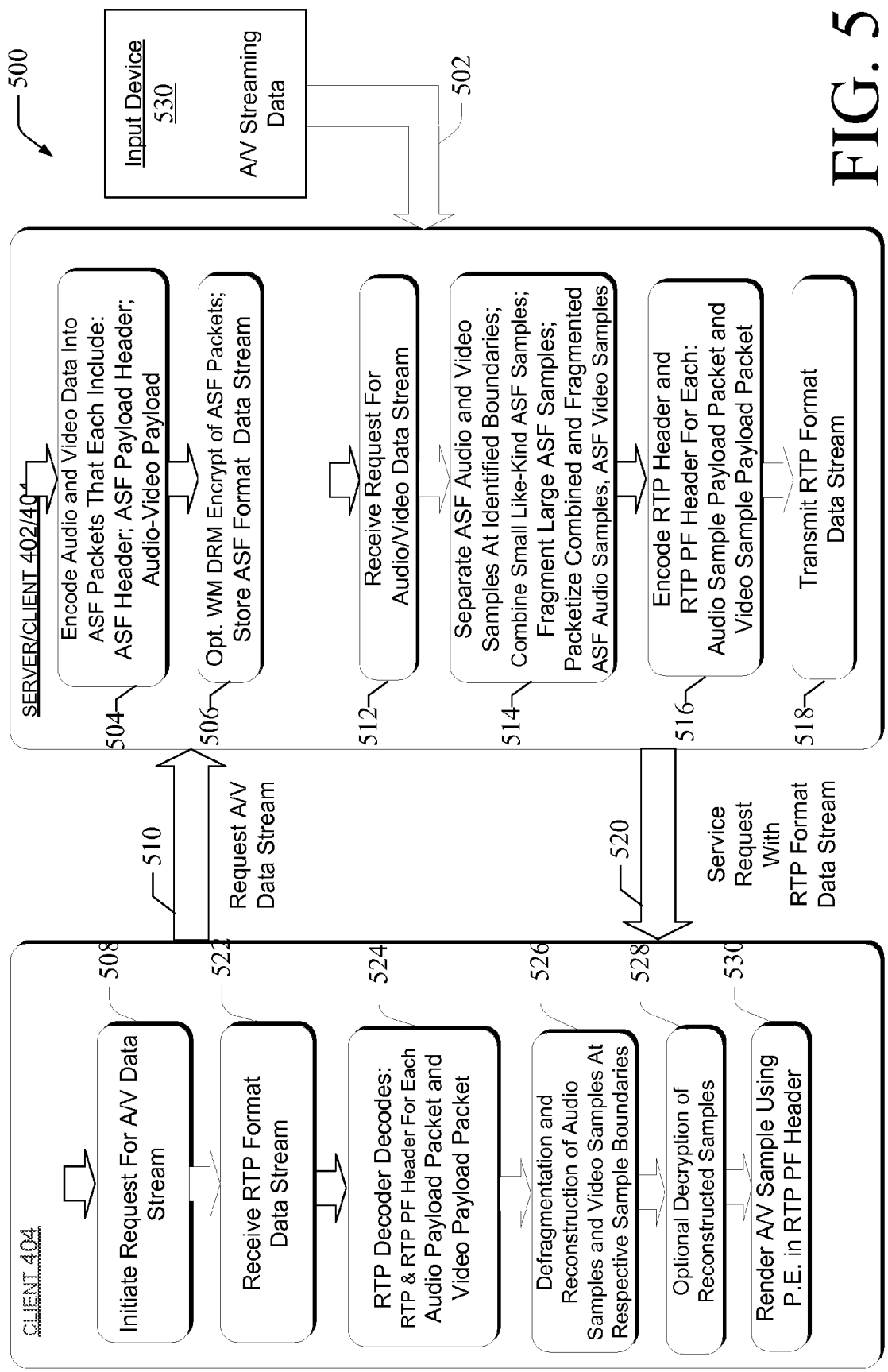

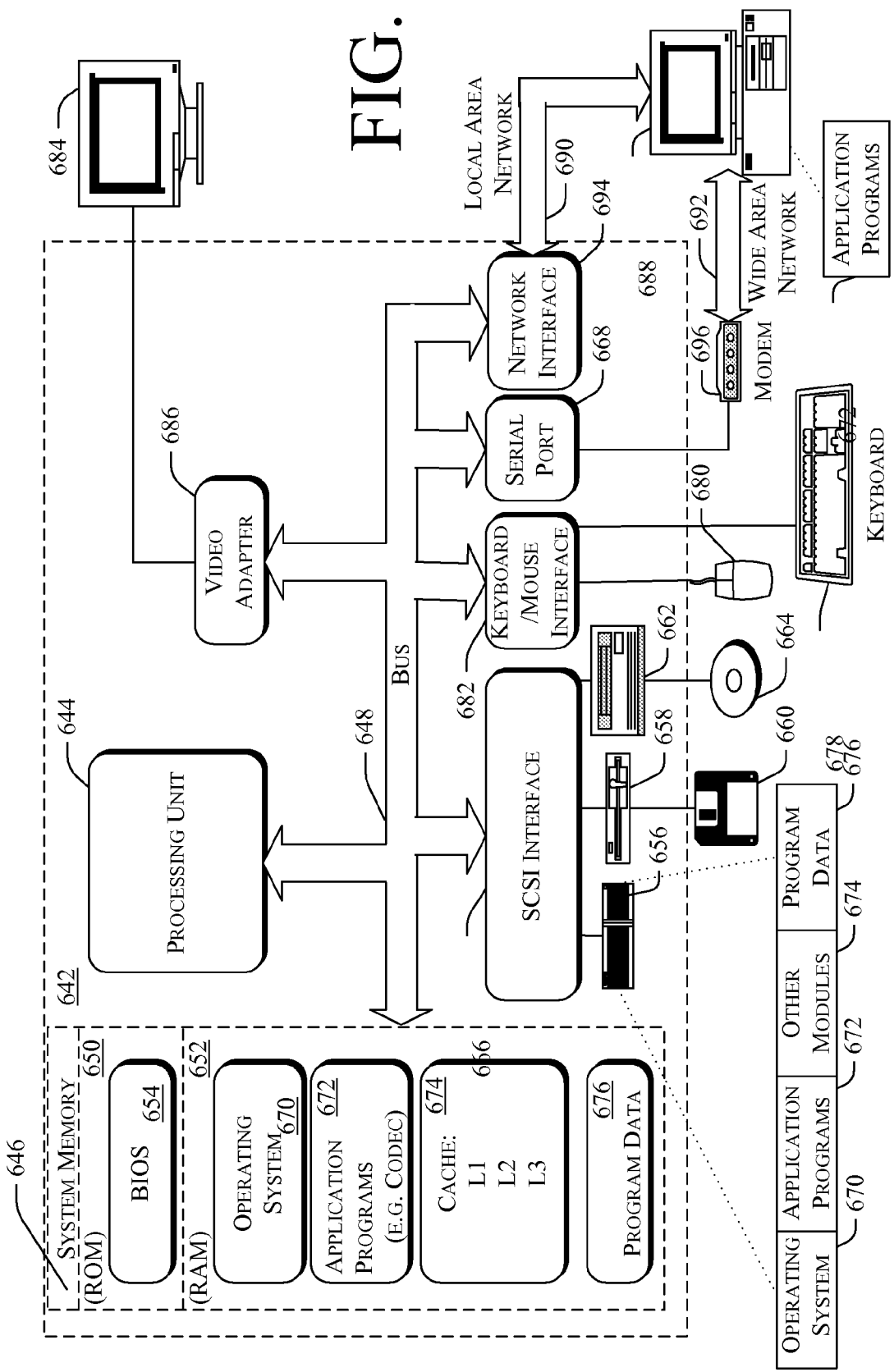

RTP PAYLOAD FORMAT

RELATED APPLICATION

This divisional application claims priority to commonly assigned co-pending U.S. patent application Ser. No. 10/612,851, U.S. Patent Publication No. 2005-0002525-A1, U.S. Pat. No. 7,483,532 to be issued on Jan. 27, 2009, entitled "RTP Payload Format" for James M. Alkove and Anders E. Klemets, filed on Jul. 3, 2003, which are incorporated by reference herein for all that it teaches and discloses.

TECHNICAL FIELD

The present invention relates to Real-Time Transport Protocol (RTP) and more particularly to an RTP wire format for streaming media (e.g. audio-video) over a network, such as the Internet.

BACKGROUND OF THE INVENTION

The following discussion assumes that the reader is familiar with the IETF RFC 1889 standard—RTP: A Transport Protocol for Real-Time Applications and with the IETF RFC 1890 standard—RTP Profile for Audio and Video Conferences with Minimal Control.

Real-time transport protocol (RTP), as defined in the RFC 1889 standard, provides end-to-end network transport functions suitable for applications transmitting real-time data, such as audio, video or simulation data, over multicast or unicast network services. These transport functions provide end-to-end delivery services for data with real-time characteristics, such as interactive audio and video. Such services include payload type identification, sequence numbering, time stamping and delivery monitoring. RTP supports data transfer to multiple destinations using multicast distribution if provided by the underlying network.

The RFC 1889 standard does not provide any mechanism to ensure timely delivery or provide other quality-of-service guarantees, but relies on lower-layer services to do so. It does not guarantee delivery or prevent out-of-order delivery, nor does it assume that the underlying network is reliable and delivers packets in sequence. The sequence numbers included in RTP allow the receiver to reconstruct the sender's packet sequence, but sequence numbers might also be used to determine the proper location of a packet, for example in video decoding, without necessarily decoding packets in sequence.

A typical application of RTP involves streaming data, where packets of Advanced Systems Format (ASF) audio-visual (AV) data is sent in RTP packets over a network from a server to a client or peer-to-peer. The ASF audio and video data can be stored together in one ASF packet. As such, an RTP packet can contain both audio and video data.

RTP, as defined the RFC 1889 standard, lacks flexibility to group multiple payloads together into a single RTP packet, and to split a payload across multiple RTP packets. Neither does the RFC 1889 standard define a format in which metadata can be delivered with each payload in an RTP packet. Another deficiency of the RFC 1889 standard is the lack of a mechanism for streaming encrypted blocks of data across a network while maintaining a block boundary of each encrypted block such that the recipient thereof can decrypt the encrypted blocks of data. In would be an advance in the art to provide such flexibility as an enhancement to RTP streaming. Consequently, there is a need for improved methods, computer-readable medium, data structures, apparatus, and computing devices that can provide such flexibility.

SUMMARY

In one implementation, packets of Advanced Systems Format (ASF) audio-visual (AV) data are repacketized into Real-Time Transport Protocol (RTP) packets and sent over a network from a server to client or by peer-to-peer network communications in response to a request to stream the AV data. The AV data is encrypted to form encryption units. The repacketizing process includes packetizing the encryption units into the RTP packets each of which includes an RTP packet header, one or more payloads of a common data stream, and a RTP payload format (PF) header for each payload. The RTP PF header includes, for the corresponding encryption units, a boundary for the payload. The payload in the RTP packet can be one or more encryption units or a fragment of an encryption unit. After the RTP packets are sent over a network, the encryption units contained in the received RTP packets are reassembled. The reassembly process uses the payloads in the RTP packets and the respective boundary in the respective RTP PF header. The reassembled encryption units can be decrypted for rendering. Each RTP PF header can have attributes for its corresponding payload that can be used to render the payload.

In a variation on the foregoing implementation, data in a format other than ASF is used to form the RTP packets. In a still further variation on the foregoing implementation, the RTP packets are formed so as to contain payloads that are not encrypted.

In yet another implementation, a wire format is provided for streaming encrypted blocks of data protected with Windows® Media Digital Rights Management (WM DRM) across a network in RTP packets (e.g., streaming WM DRM protected content). Each RTP packet contains header data to maintain encryption block boundaries so that each encryption unit can be decrypted by the recipient thereof. Upon decryption using the WM DRM protocol, the streaming data can be rendered by the recipient.

BRIEF DESCRIPTION OF THE DRAWINGS

FIG. 5 is a block diagram, in accordance with an embodiment of the present invention, illustrating communications between a server (or client) and a client, where the server (or client) serves to the client a requested audio-visual data stream that the client can render.

FIG. 6 is a block diagram, in accordance with an embodiment of the present invention, of a networked computer that can be used to implement either a server or a client.

DETAILED DESCRIPTION

Implementations disclosed herein define wire formats for delivery of single and mixed data streams, such as Windows® media data via Real-Time Transport Protocol (RTP). The delivery can be between server and client, as well as in a peer to peer context (e.g., a Windows® Messenger™ audio-visual conference software environment).

A wire format, in various implementations, enhances the IETF RFC 1889 standard to provide greater flexibility for RTP delivery. Implementations provide a mechanism for streaming of audio data in RTP packets that are separate from video data in RTP packets. Implementations also provide a wire format in which metadata can be delivered with each payload in an RTP packet, where the metadata provides rich information that is descriptive of the payload. Still other implementations provide a mechanism for streaming encrypted blocks of data across a network while maintaining a block boundary of each encrypted block such that the recipient thereof can decrypt the encrypted blocks of data. In another implementation, a wire format provides for delivery of data that is protected with Windows® Media Digital Rights Management (WM DRM) such that the delivery thereof can be unencrypted for rendering.

Various implementations disclosed herein repackage data in a series of media packets that are included in a system layer bit stream. These data are packetized into RTP packets consistent with, yet enhancing, the RFC 1889 standard such that the system layer bit stream is mapped to RTP. In this mapping, each media packet contains one or more payloads. In some system layer bit streams, there may be mixed media packets having data such as audio data, video data, program data, JPEG Data, HTML data, MIDI data, etc. A mixed media packet is a media packet where two or more of its payloads belong to different media streams.

Various implementations apply to system layer bit streams where each media packet is a single media packet. In a single media packet, all of the payloads in the media packet belong to the same media stream. Other implementations apply to system layer bit streams where each media packet always contains only one (1) payload. In still further implementations, the size of the "payload header" in the media packet is zero—which is likely if each media packet only contains a single payload, but could also happen when there are multiple payloads where the media packet header contains information about the size of each payload.

Figure 1:
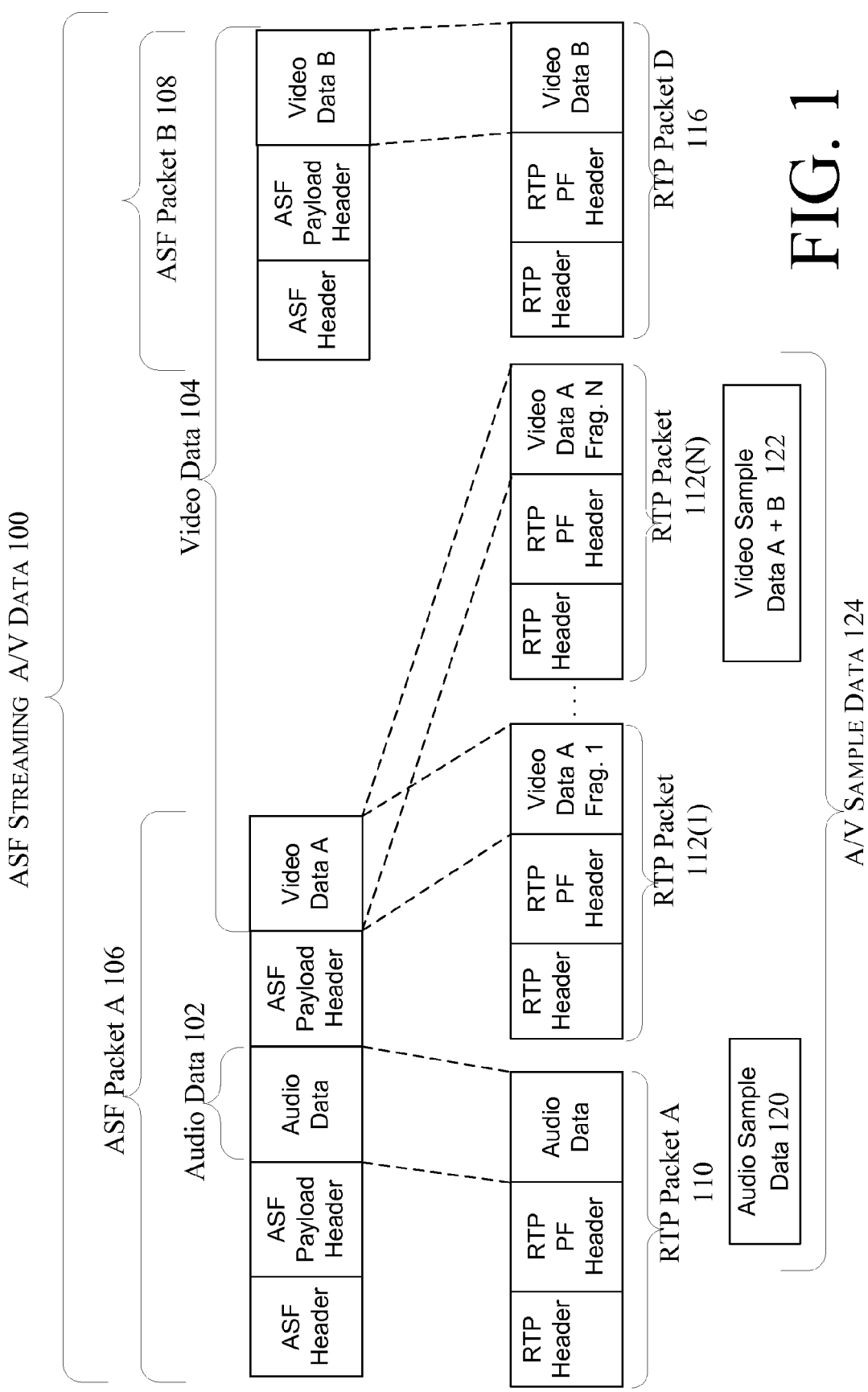
FIG. 1 is an illustration of an exemplary process, in accordance with an embodiment of the invention, for the transformation of two (2) packets of Advanced Systems Format (ASF) audio-visual (AV) data into four (4) RTP packets, where the audio data and the video data are packetized separately in the resultant RTP packets, and where block boundaries for each payload are preserved such that original AV samples that were encrypted and packetized in the two ASF packets can be reconstructed by a decryption mechanism.
Figure 2:
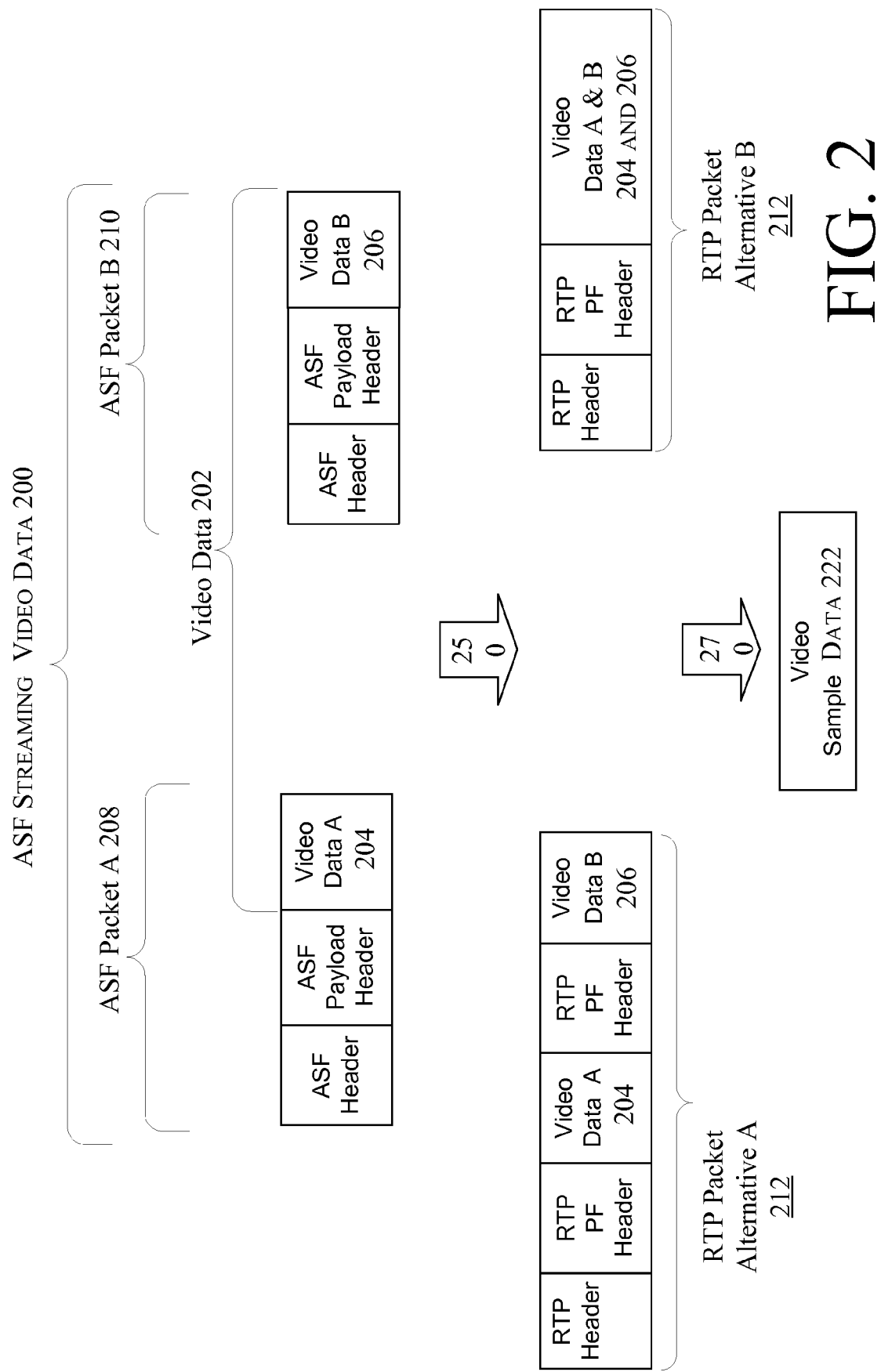
FIG. 2 is an illustration of alternative exemplary processes, in accordance with different embodiments of the invention, for the transformation of two (2) packets of ASF video data into one (1) RTP packet, where one alternative process moves the payloads of the ASF packets into separate payloads in the RTP packet, where the other alternative process combines the payloads of the ASF packets into a combined payload in the RTP packet, and where block boundaries for each payload are preserved such that an original video sample that was encrypted and packetized in the two ASF packets can be reconstructed by a decryption mechanism.

FIGS. 1-2 depict exemplary implementations in which the system layer bit streams include a series of Advanced Systems Format (ASF) packets each having data therein. These data are packetized into RTP packets consistent with, yet enhancing, the RFC 1889 standard. As such, the system layer bit streams includes a series of media packets that are ASF packets, and the payload in each ASF packet is an ASF payload. While ASF packets are being used for illustration, the creation of RTP packets, in other implementations disclosed herein, is not limited to the use of ASF format data but may rather use other formats in which data to be streamed is stored. These other formats, as well as the ASF format, are generally described herein as system layer bit streams that include a plurality of media packets each having data therein, where these data are mapped to RTP in various implementations.

ASF Steaming Audio-Visual (AV) data 100 is depicted in FIG. 1. The ASF Streaming AV data 100, which includes audio data 102 and video data 104, has been packetized into an ASF packet A 106 and an ASF packet B 108. ASF packet A 106 includes a first ASF header, an ASF payload header, audio data 102, a second ASF header, and a video data A fragment of video data 104. ASF packet B 108 includes an ASF header, an ASF payload header, and a video data B fragment of video data 104.

The ASF Streaming AV data 100 as expressed in ASF packet A 106 and ASF packet B 108, in one implementation, can be packetized into a plurality of RTP packets. As seen in FIG. 1, these include RTP packet A 110, RTP packet 112(1) through RTP packet 112(N), and RTP packet D 116. Each RTP packet, in accordance with the RFC 1889 standard, has an RTP packet header, a payload, and an RTP payload format (PF) header. As used herein the RTP PF header is a payload header in the RTP packet. Only one (1) type of media is in the RTP packet. Stated otherwise, the RTP packet does not contain mixed media payloads. In the implementation depicted in FIG. 1, video data A of ASF packet A 106 is too large to fit into a single RTP packet. As such, video data A of ASF packet A 106 is divided among RTP packet 112(1) through RTP packet 112(N). The RTP packet size can be a function of a physical characteristic of an underlying network over which the RTP packets are to be transmitted, or an administrative policy with respect to packet size such as can be made by the administrator of the underlying network, or an assessment of the transmission bandwidth of the underlying network.

Following the RTP packetization depicted in FIG. 1, audio data 102 is included in RTP packet A 110 and video data B of ASF packet B 108 is included in RTP packet D 116. Each RTP PF header of each RTP packet can contain information relating to the separation of the audio and video data into respectively separate RTP packets. Thus, A/V streaming sample data 124 can be reconstructed from the audio data in RTP packet A 110, video data A fragment 1 through video data A fragment N in respective RTP packets 112(1) through 112(N), and video data B in RTP packet D 116. Once the reconstruction of A/V streaming sample data 124 is complete, the audio sample data 120 and the video sample data A+B 122 therein can be rendered in a streaming context. Given the foregoing, FIG. 1 illustrates a wire format in which smaller RTP packets are created from larger ASF packets, where the packetization puts a payload of different data streams into separate packets each with its own RTP PF header. FIG. 1 also illustrates an implementation of a wire format in which block boundaries for each payload are preserved such that original audio and video samples that were encrypted and packetized in ASF packets can be reconstructed by a decryption mechanism that is performed upon the RTP packets.

ASF Steaming AV data 200 is depicted in FIG. 2. The ASF Streaming AV data 200, which includes video data 202, has been packetized into an ASF packet A 208 and an ASF packet B 210. ASF packet A 208 includes an ASF header, an ASF payload header, and video data A 204. ASF packet B 210 includes an ASF header, an ASF payload header, and a video data B 206. FIG. 2 shows two (2) alternatives for packetizing ASF Streaming AV data 200 into RTP packets consistent with, yet enhancing, the RFC 1889 standard.

In the first alternative, following arrow 250, video data A 204 and video data B 206 are packetized into a single RTP packet alternative A 212 having an RTP header. Each of video data A 204 and video data B 206 is preceded by an RTP PF header. RTP packet alternative A 212, in accordance with the RFC 1889 standard, has an RTP header, multiple payloads, and respective RTP PF headers.

In the second alternative, also following arrow 250, video data A 204 and video data B 206, from respective ASF packets, are packetized into an RTP packet alternative B 214 having an RTP header. Video data A 204 and video data B 206 are assembled contiguously as the payload in RTP packet alternative B 214. The payload is preceded by an RTP PF header. RTP packet alternative B 214, in accordance with the RFC 1889 standard, has an RTP header, a payload, and one RTP PF header.

Following the RTP packetization depicted in FIG. 2, video data A and B (204, 206) are included in either RTP packet alternative A 212 or in RTP packet alternative B 214. Each RTP PF header can contains information relating to the corresponding payload. Each of the alternative RTP packets 212, 214 contain sufficient data to reconstruct ASF packet A 208 and ASF packet B 210 so as to obtain therein video data A and B (204, 206). Once the reconstruction of is complete, the video sample data 222 can be rendered in a streaming context. Given the foregoing, FIG. 2 illustrates an RTP wire format in which larger RTP packets are created from small ASF packets, and where block boundaries for each payload are preserved such that original video samples that were encrypted and packetized in the two ASF packets can be reconstructed by a decryption mechanism that is performed upon the RTP packets.

Figure 3A:
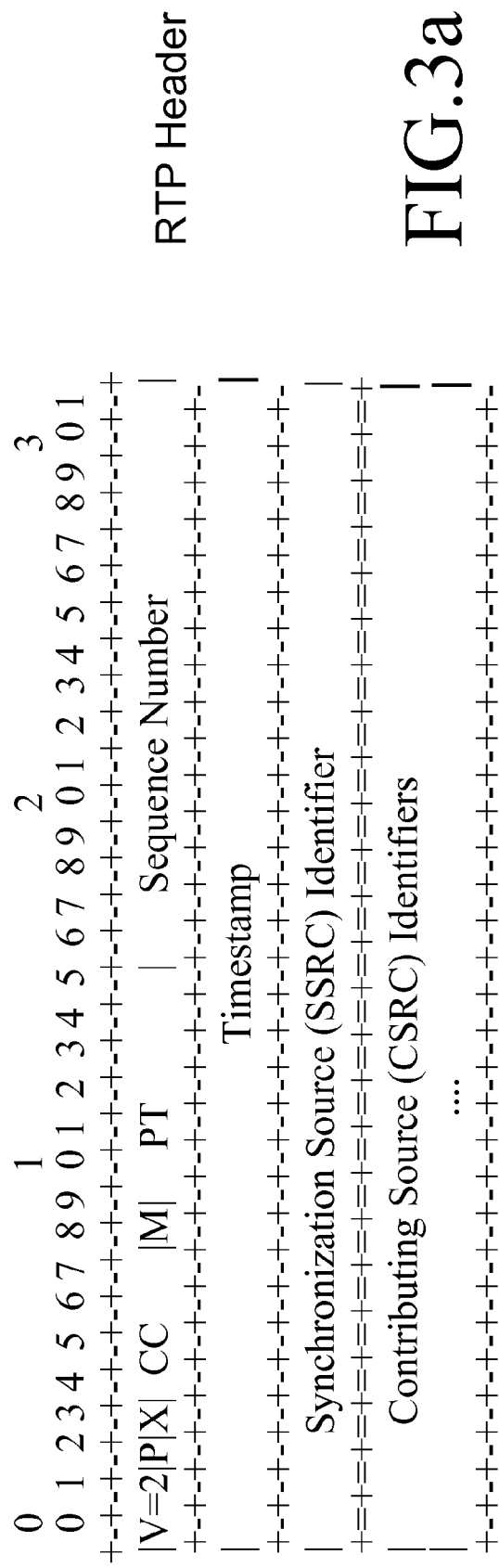
FIGS. 3a-3b are respective data structure layouts, in accordance with an embodiment of the present invention, for an RTP header and a corresponding payload header.

FIG. 3a depicts a data structure layout for fields in an RTP header. The RTP header is more fully described in the RFC 1889 standard. The timestamp field in the RTP header should be set to the presentation time of the sample contained in the RTP packet. In one implementation, the clock frequency is 1 kHz unless specified to be different through means independent of RTP.

The 8th bit from the start of the RTP header is interpreted as a marker (M) bit field. The M bit is set to zero, but will be set to one ("1") whenever the corresponding RTP packet has payload that is not a fragment of a sample, contains the final fragment of a sample, or is one of a plurality of complete samples in the RTP packet. The M bit can be used by a receiver to detect the receipt of a complete sample for decoding and presenting. Thus, the M bit in the RTP header can be used to mark significant events in a packet stream (e.g., video sample frame boundaries).

Figure 3B:
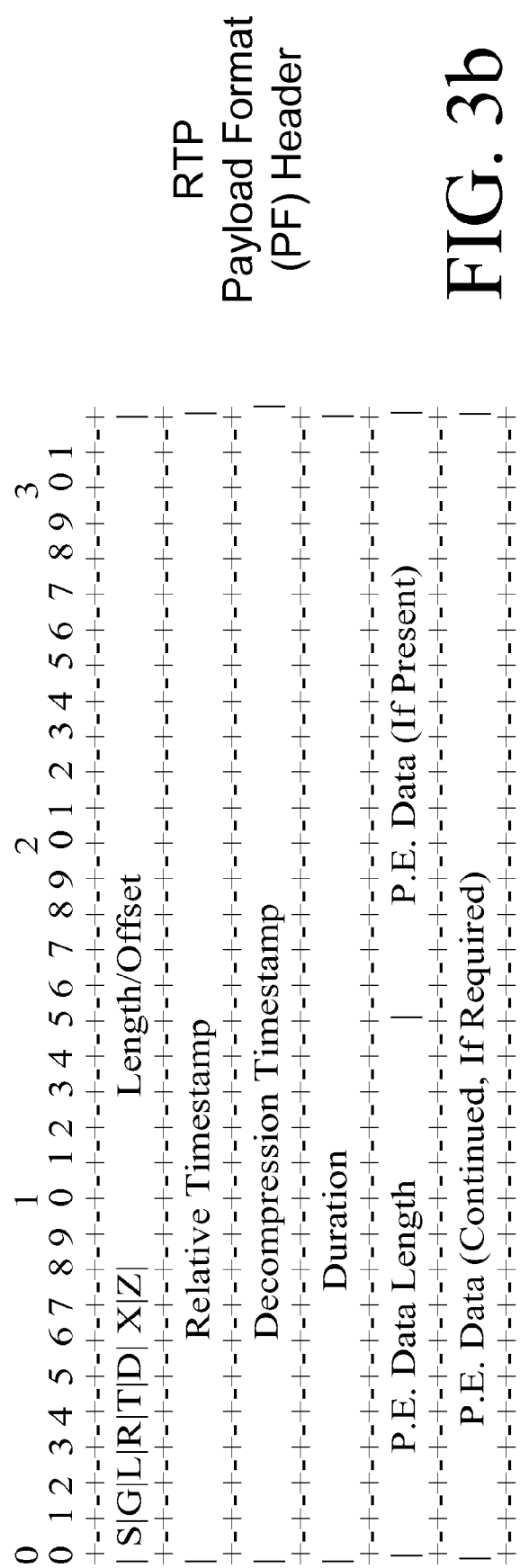

FIG. 3b depicts one implementation of an RTP payload format (PF) Header or payload header. The RTP PF header has a sixteen (16) bit fixed length portion followed by a variable length portion. The fields of the RTP PF header depicted in FIG. 3b include a 8-bit string indicated by the character fields "SGLRTDXZ", a length/offset field, a relative timestamp field, a decompression time field, a duration field, and a Payload Extension (P.E.) length field and a corresponding P.E. data field, each of which is explained below.

The S field is one (1) bit in length and is set to one ("1") if the corresponding payload (e.g., sample, fragment of a sample, or combination of samples) is a key sample, i.e. intracoded sample or I-Frame. Otherwise it is set to zero. The S-bit in all RTP PF headers preceding fragments of the same sample must be set to the same value.

The G field is one (1) bit in length and is used to group sub-samples in a corresponding payload that make up a single sample. Windows® Media Digital Rights Management (WM DRM) encrypts content based on the "ASF Payload" boundaries. In order to allow this content to be correctly decrypted, the boundaries of the sub-samples in the payload can be communicated to the client that is to receive the payload. For instance, an encryption unit can be packetized such that it is broken into a plurality of transmission units (e.g., placed within separate packets) that are to be transmitted. Before the broken plurality of transmission units can be decrypted at a receiving client they have to be reassembled into the original encrypted form. As in other decryption methodologies and mechanisms, the client can use the boundaries to properly reconstruct the encrypted encryption units in preparation for decryption of the encrypted content. As such, each "ASF Payload" should be preceded by this RTP PF header.

The G field bit should be set to zero ("0") to indicate that an encrypted "unit" has been fragmented. If ASF is being used, the encryption unit will be an ASF payload and the bit is set to zero ("0") on all fragmented ASF payloads, except the last ASF payload. In this case, whether or not a sample has been fragmented does not matter. If ASF is not being used the encryption unit is a media sample, in which case the G bit is set to zero ("0") on all fragmented media samples except the last sample. As to this latter case, the concern about whether or not an ASF payload has been fragmented is not applicable, since ASF is not used.

The L field is one (1) bit in length and is set to one ("1") if the Length/Offset field contains a length. Otherwise it is set to zero ("0") and the Length/Offset field contains an offset. The L-bit must be set to one ("1") in all RTP PF headers preceding a complete (unfragmented) sample in the corresponding payload and must be set to zero in all RTP PF headers that precede a payload containing a fragmented sample.

The R field is one (1) bit in length and is set to one ("1") if the RTP PF header contains a relative timestamp. Otherwise it is set to zero. The R-bit in all headers preceding fragments of the same sample must be set to the same value.

The T field is one (1) bit in length and is set to one ("1") if the RTP PF header contains a decompression time. Otherwise it is set to zero. The T-bit in all RTP PF headers that precede a payload that contains a fragment of the same sample must be set to the same value.

The D field is one (1) bit in length and is set to one ("1") if the RTP PF header contains a sample duration. Otherwise it is set to zero. The D-bit in all RTP PF headers that precede a payload containing fragments of the same sample must be set to the same value.

The X field is one (1) bit in length and is for optional or unspecified use. A transmitter of an RTP packet should set this bit to zero and a receiver thereof can ignore this bit.

The Z field is one (1) bit in length and is set to one ("1") if the RTP PF header contains Payload Extension (P.E.) data, which can be metadata regarding the corresponding payload. Otherwise the Z field is set to zero. The Z field bit could be zero for all RTP PF headers whose M-bit is zero, but it should be set for all RTP PF headers whose M-bit is set to one ("1") if the corresponding payload has P.E. data associated with it.

The Length/Offset field is twenty four (24) bits in length and quantifies the length or offset of a single sample that has been fragmented over multiple RTP packets. The L-bit is set to zero and the Length/Offset field contains the byte offset of the first byte of this fragment from the beginning of the corresponding payload (e.g., sample or fragment thereof). If one or more complete samples are contained in the RTP packet, the L-bit is set to one ("1") in each RTP PF header, and the Sample Length/Offset field contains the length of the sample (including the RTP PF header).

The Relative Timestamp field is thirty-two (32) bits in length and is present only if the R-bit is set to one ("1"). It contains the relative timestamp for the corresponding sample with respect to the timestamp in the corresponding RTP header. The timescale used is the same as that used for the timestamp in the RTP header. The Relative Timestamp field is specified as a signed 32-bit number to allow for negative offsets from the timestamp of the RTP header. When the Relative Timestamp field is absent, a default relative timestamp of zero can be used.

The Decompression Time is thirty-two (32) bits in length and is present only if the T-bit is set to one ("1"). It contains the decompression time relative to the timestamp in the RTP header. The timescale used is the same as that used for the timestamp in the RTP header. This field is specified as a signed 32-bit number to allow for negative offsets from the timestamp in the RTP header.

The Duration field is thirty-two (32) bits in length and is present only if the D-bit is set to one ("1"). It contains the duration of the corresponding sample. The timescale used is the same as that used for the timestamp in the RTP header. The Duration field, in all RTP PF headers preceding fragments of the same sample, should be set to the same value. When this field is absent, the default duration is implicitly or explicitly obtained from the sample data. If this is not practical, the default is the difference between this sample's timestamp and the next sample's timestamp.

The Payload Extension (P.E.) Data Length field is sixteen (16) bits in length and is present only if the Z-bit is set to one ("1"). It contains the number of bytes of P.E. data contained after the fixed part of the RTP PF header. The P.E. data is variable in length and contain one of more attributes descriptive of the corresponding payload that it precedes. The P.E. data length field immediately follows the fixed part of the payload header and will be a number of bytes that contain the actual P.E. data. The structure of the P.E. data is communicated between the client and server (or peer to peer), such as via an SDP description. In one implementation for WM DRM protected content, there can be at least 4 bytes of DUE data representing the WM DRM payload ID associated with every sample.

While FIGS. 3a-3b show various fields in various orders for an RTP header and RTP PF header, not all fields are required and the order thereof can be rearranged. In some implementations, the required fields and order therefore may be consistent with, yet extend, the flexibility of the RFC 1889 standard. While ASF packets are being used for illustration of FIG. 3a-3b, the creation of RTP packets, RTP PF headers and payloads therefore, in other implementations disclosed herein, is not limited to the use of ASF format data but may rather use other formats in which data to be streamed is stored.

General Network Structure

Figure 4:
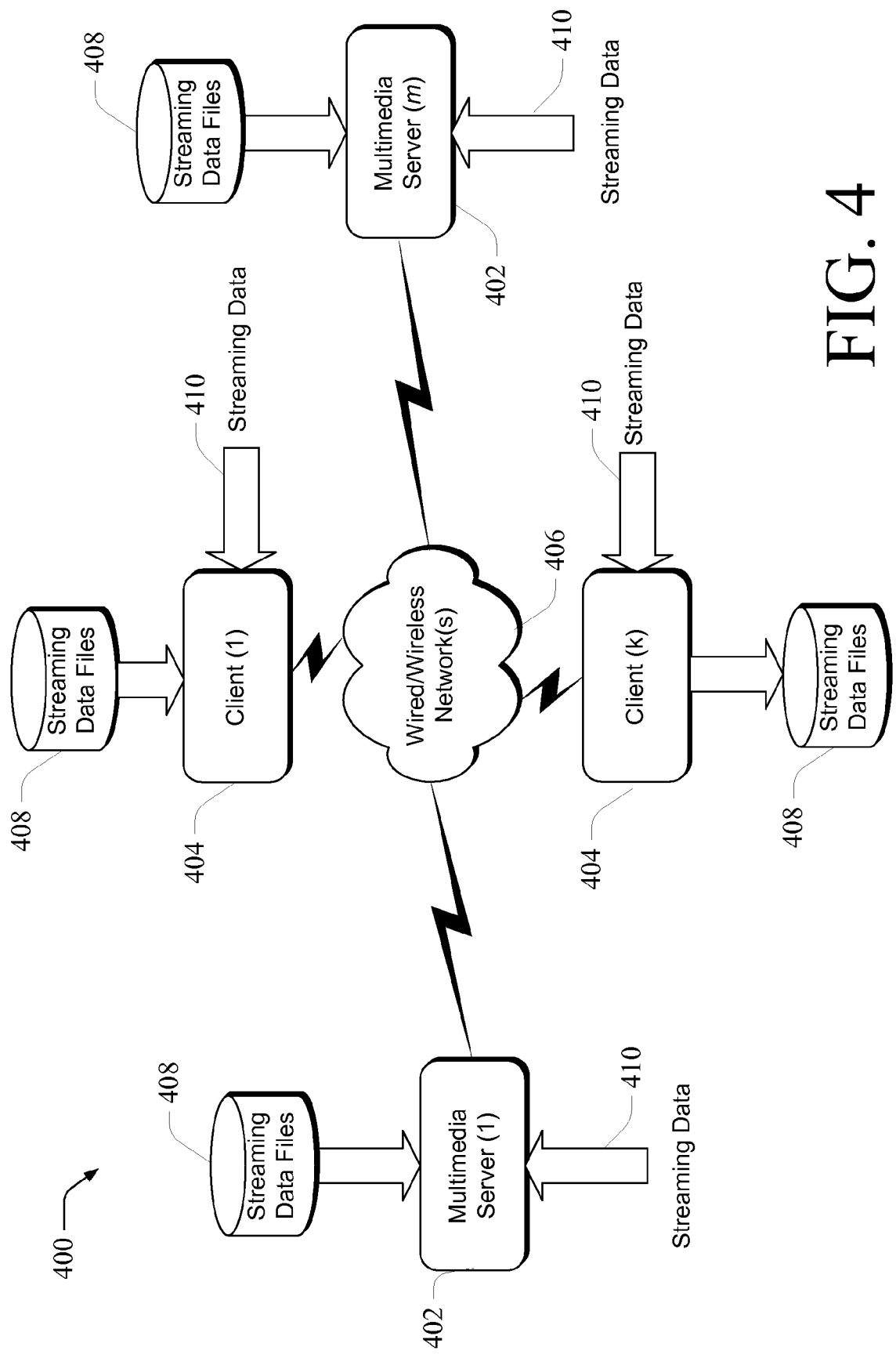
FIG. 4 is a block diagram, in accordance with an embodiment of the present invention, of a networked client/server system in which streaming can be performed by server to client or peer to peer.

FIG. 4 shows a client/server network system 400 and environment in accordance with the invention. Generally, the system 400 includes one or more (m) network multimedia servers 402 and one or more (k) network clients 404. The computers communicate with each other over a data communications network, which in FIG. 4 includes a wired/wireless network 406. The data communications network 406 might also include the Internet or local-area networks and private wide-area networks. Servers 402 and clients 404 communicate with one another via any of a wide variety of known protocols, such as the Transmission Control Protocol (TCP) or User Datagram Protocol (UDP).

Multimedia servers/clients 402/404 have access to streaming media content in the form of different media streams. These media streams can be individual media streams (e.g., audio, video, graphical, simulation, etc.), or alternatively composite media streams including multiple such individual streams. Some media streams might be stored as files 408 in a database (e.g., ASF files) or other file storage system, while other media streams 410 might be supplied to the multimedia server 402 or client 404 on a "live" basis from other data source components through dedicated communications channels or through the Internet itself.

The media streams received from servers 402 or from clients 404 are rendered at the client 404 as a multimedia presentation, which can include media streams from one or more of the servers/clients 402/404. These different media streams can include one or more of the same or different types of media streams. For example, a multimedia presentation may include two video streams, one audio stream, and one stream of graphical images. A user interface (UI) at the client 404 can allows users various controls, such as allowing a user to either increase or decrease the speed at which the media presentation is rendered.

Exemplary Computer Environment

In the discussion below, the invention will be described in the general context of computer-executable instructions, such as program modules, being executed by one or more conventional personal computers. Generally, program modules include routines, programs, objects, components, data structures, etc. perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices. Alternatively, the invention could be implemented in hardware or a combination of hardware, software, and/or firmware. For example, one or more application specific integrated circuits (ASICs) could be programmed to carry out the invention.

As shown in FIG. 4, a network system in accordance with the invention includes network server(s) and client 402, 404 from which a plurality of media streams are available. In some cases, the media streams are actually stored by server(s) and/or client 402, 404. In other cases, server(s) and/or client (s) 402, 404 can obtain the media streams from other network sources or devices. Generally, the network clients 404 are responsive to user input to request media streams corresponding to selected multimedia content. In response to a request for a media stream corresponding to multimedia content, server(s) and/or clients 402, 404 stream the requested media streams to the requesting network client 404 in accordance with an RTP wire format. The client 404 decrypts the payloads in the respective RTP packets and renders the resultant unencrypted data streams to produce the requested multimedia content.

FIG. 5 illustrates the input and storage of A/V streaming data on a server 402 or a client 404 (e.g., a peer). FIG. 5 also illustrates communications between server and client (402-404) or peer-to-peer (404-404) in accordance with various implementations. By way of overview, the server or client 402, 404 receives input of A/V streaming data from an input device 530. The server or client 402, 404 encodes the input using an encoder of a codec. The encoding can, but need not, be performed on ASF format data. If ASF format data is used, the encoding is performed upon ASF packets that each include an ASF header, and ASF payload header, and an AV (audio and/or video) payload. The encoding can include encryption, such as where WM DRM is used. The ASF packets are stored by the server/client 402, 404 for serving future requests for same.

Subsequently, the client requests the corresponding AV data stream from the server/client. The server/client retrieves and transmits to the client the corresponding AV stream that the server/client had previously stored. Upon receipt, the client decodes the AV data stream, and reconstructs and decrypts encrypted broken up AV data stream samples using boundaries communicated in the corresponding RTP PF headers. The client can then perform rendering of the streamed AV data.

The flow of data in seen in FIG. 5 between and among blocks 504-530. At block 504, an input device 502 furnishes to server/client 402/404 input that includes A/V streaming data. By way of example, the A/V streaming data might be supplied to server/client 402/404 on a "live" basis by input device 502 through dedicated communications channels or through the Internet. The A/V streaming data is supplied to an encoder at block 504 for placing the data into ASF packets. At block 506, optional WM DRM encryption is employed and the ASF packets are stored at the server/client 402/404. A result of the WM DRM encryption and packetization can be that an encryption unit is broken into a plurality of separate packets. Before the broken plurality of transmission units can be decrypted at a receiving client they have to be reassembled at the client into the original encryption units. As such, the boundaries of the broken transmission units are stored in the ASF payload headers at block 506.

At block 508, client 404 makes a request for the A/V data stream that is transmitted to server/client 402/404 as seen at arrow 510 in FIG. 5. At block 512, server/client 402/404 receives the request. The corresponding ASF packets that contain the requested A/V data stream are retrieved. At block 514, audio and video payloads in the ASF packets are logically separated so that they can be separately packetized into RTP packets. Boundaries for each logically separate audio and video payload are identified.

A bandwidth of the network over which RTP packets are to be transmitted is determined. This determination is used to derive a predetermined RTP packet size. Where the ASF packet size is smaller than the predetermined RTP packet size, like-kind payloads can be combined into a single RTP packet. Where the ASF packet size is bigger than the predetermined RTP packet size, ASF payloads can be fragmented for placement as a payload into a single RTP packet. Boundaries for each RTP payload are determined using the corresponding logically separate audio and video payloads of the ASF packets.

At step 516, the RTP header, RTP PF header, and respective payload are assembled for each RTP packet. As such, a plurality of RTP packets have been formed that represent a plurality of ASF packets, where the ASF packets contain the A/V data stream that was requested by client 404. The RTP packets are streamed for rendering at client 404 from server/client 402/404 via a transmission function at block 518.

An arrow 520 in FIG. 5 shows transmission of the RTP packets from server/client 402/404 to client 404. At block 522, client 404 receives the RTP packets. At block 524, an RTP decoder at client 404 decodes each received RTP packet, including the RTP header, and RTP PF header. At block 526, a process performs defragmentation and reconstruction of the ASF packets containing the requested A/V datastream. The defragmentation and reconstruction uses boundaries set forth in the RTP PF header for each corresponding payload containing, for instance, a sample or fragment thereof.

At block 528, the reconstructed ASF packets are decrypted for rendering at block 530. The RTP PF header in an RTP packet may contain Payload Extension (P.E.) data that is descriptive of the corresponding payload. The P.E. data can thus provide metadata that can be used during a rendering of the payload in the corresponding RTP packet at block 530. The blocks 522-530 are repeated for each RTP packet that is received at client 404, thereby accomplishing the streaming of the A/V data from server/client 402/404 for rendering.

FIG. 6 shows a general example of a computer 642 that can be used in accordance with the invention. Computer 642 is shown as an example of a computer that can perform the functions of any of clients 402 or servers 404 of FIGS. 4-5. Computer 642 includes one or more processors or processing units 644, a system memory 646, and a system bus 648 that couples various system components including the system memory 646 to processors 644.

The bus 648 represents one or more of any of several types of bus structures, including a memory bus or memory controller, a peripheral bus, an accelerated graphics port, and a processor or local bus using any of a variety of bus architectures. The system memory includes read only memory (ROM) 650 and random access memory (RAM) 652. A cache 675 have levels L1, L2, and L3 may be included in RAM 652. A basic input/output system (BIOS) 654, containing the basic routines that help to transfer information between elements within computer 642, such as during start-up, is stored in ROM 650. Computer 642 further includes a hard disk drive 656 for reading from and writing to a hard disk (not shown) a magnetic disk drive 658 for reading from and writing to a removable magnetic disk 660, and an optical disk drive 662 for reading from or writing to a removable optical disk 664 such as a CD ROM or other optical media.

Any of the hard disk (not shown), magnetic disk drive 658, optical disk drive 662, or removable optical disk 664 can be an information medium having recorded information thereon. The information medium has a data area for recording stream data using stream packets each of which includes a packet area containing one or more data packets. By way of example, each data packet is encoded and decoded by a Codec of application programs 672 executing in processing unit 644. As such, the encoder distributes the stream data to the data packet areas in the stream packets so that the distributed stream data are recorded in the data packet areas using an encoding algorithm. Alternatively, encoding and decoding of data packets can be performed as a function of operating system 670 executing on processing unit 644.

The hard disk drive 656, magnetic disk drive 658, and optical disk drive 662 are connected to the system bus 648 by an SCSI interface 666 or some other appropriate interface. The drives and their associated computer-readable media provide nonvolatile storage of computer readable instructions, data structures, program modules and other data for computer 642. Although the exemplary environment described herein employs a hard disk, a removable magnetic disk 660 and a removable optical disk 664, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 660, optical disk 664, ROM 650, or RAM 652, including an operating system 670, one or more application programs 672 (which may include the Codec), other program modules 674, and program data 676. A user may enter commands and information into computer 642 through input devices such as keyboard 678 and pointing device 680. Other input devices (not shown) may include a microphone, joystick, game pad, satellite dish, scanner, or the like. These and other input devices are connected to the processing unit 644 through an interface 682 that is coupled to the system bus. A monitor 684 or other type of display device is also connected to the system bus 648 via an interface, such as a video adapter 686. In addition to the monitor, personal computers typically include other peripheral output devices (not shown) such as speakers and printers.

Computer 642 operates in a networked environment using logical connections to one or more remote computers, such as a remote computer 688. The remote computer 688 may be another personal computer, a server, a router, a network PC, a peer device or other common network node, and typically includes many or all of the elements described above relative to computer 642, although only a memory storage device 690 has been illustrated in FIG. 6. The logical connections depicted in FIG. 6 include a local area network (LAN) 692 and a wide area network (WAN) 694. Such networking environments are commonplace in offices, enterprise-wide computer networks, intranets, and the Internet. In the described embodiment of the invention, remote computer 688 executes an Internet Web browser program such as the Internet Explorer® Web browser manufactured and distributed by Microsoft Corporation of Redmond, Wash.

When used in a LAN networking environment, computer 642 is connected to the local network 692 through a network interface or adapter 696. When used in a WAN networking environment, computer 642 typically includes a modem 698 or other means for establishing communications over the wide area network 694, such as the Internet. The modem 698, which may be internal or external, is connected to the system bus 648 via a serial port interface 668. In a networked environment, program modules depicted relative to the personal computer 642, or portions thereof, may be stored in the remote memory storage device. It will be appreciated that the network connections shown are exemplary and other means of establishing a communications link between the computers may be used.

Generally, the data processors of computer 642 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Implementations disclosed herein define a wire format that can be used in delivery of multimedia data between server and client and peer to peer via RTP. The wire format allows for greater flexibility than the currently adopted IETF RFC 1889 standards for RTP delivery. Implementations of the wire format provide for streaming of encrypted data, provide a mechanism for delivering per sample metadata via RTP, and provide for streaming of data that is protected with WM DRM.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising computer-instructions executable by a processor, the method changing a plurality of single media packets into a composite packet, wherein:
    each single media packet includes:
        a payload of one data stream, wherein the payload is encrypted and has an arbitrary block size;
        a payload header for the payload and including a boundary for the arbitrary block size;
    the composite packet corresponds to the plurality of single media packets and includes:
        one or more payloads of a like data stream and corresponding to the respective payloads of the plurality of single media packets; and
        a payload profile format header for each payload in the composite packet and corresponding to the payload headers of the plurality of single media packets, wherein the payload profile format header has a payload boundary for a respective payload in the composite packet that identifies an order thereof in the plurality of single media packets.

2. The method of claim 1, wherein the composite packet further comprises:
    a packet header corresponding to packet headers for each of the plurality of single media packets;
    a composition selected from the group consisting of:
        a plurality of payloads each having a corresponding payload profile format header; and
        one payload and a corresponding payload profile format header.

3. The method of claim 1, wherein each single media packet is less than a predetermined size that is a function of selected from the group consisting of:
    a physical characteristic of an underlying network;
    an administrative policy with respect to packet size; and
    an assessment of a transmission bandwidth of the underlying network.

4. The method of claim 1, wherein the data stream is selected from the group consisting of audio data, video data, program data, JPEG Data, HTML data, and MIDI data.

5. The method of claim 1, wherein the one or more payloads includes a mixed media packet that includes a portion of an Advanced Systems Format (ASF) data stream, an ASF packet header, and at least one ASF payload header; and
    wherein each single media packet includes a Real-Time Transport Protocol (RTP) packet header, one RTP payload format header, and a portion of a RTP data stream.

6. The method of claim 1, wherein:
the payload profile format header includes a fixed length portion and a variable length portion; and
the variable length portion includes attributes of the corresponding payload.

7. The method of claim 1, further comprising extracting, for each Real-Time Transport Protocol (RTP) payload:
assembling a plurality of portions of one of the media data types into a contiguous payload, wherein the RTP payload includes the plurality of portions;
assembling one portion of one of the media data types into a contiguous payload, wherein the RTP payload includes one portion of the media data types; and
assembling all of the fragments of the one portion of one of the media data types into a contiguous payload, wherein the RTP payload includes a fragment of one portion of one of the media data types.

8. A computer-readable storage medium having computer-readable instructions that, when executed on a processor, perform the method of claim 1.

9. A system for changing a plurality of single media packets into a composite packet, the system comprising:
a server receiving the single media packets, each single media packet includes a payload of one data stream from an input device, the single media packet includes a payload of one data stream and a payload header,
the server encrypting the payload which has an arbitrary block size and a boundary for the arbitrary block size; and
the server changing the plurality of single media packets into the composite packet, the composite packet corresponds to the plurality of single media packets and includes:
one or more payloads of a like data stream and corresponding to the respective payloads of the plurality of single media packets; and
a payload profile format header for each payload in the composite packet and corresponding to the payload headers of the plurality of single media packets, wherein the payload profile format header has a payload boundary for a respective payload in the composite packet that identifies an order thereof in the plurality of single media packets.

10. The system of claim 9, wherein the composite packet further comprises:
a packet header corresponding to packet headers for each of the plurality of single media packets;
a composition selected from the group consisting of:
a plurality of payloads each having a corresponding payload profile format header; and
one payload and a corresponding payload profile format header.

11. The system of claim 9, wherein each single media packet is less than a predetermined size that is a function of selected from the group consisting of:
a physical characteristic of an underlying network;
an administrative policy with respect to packet size; and
an assessment of a transmission bandwidth of the underlying network.

12. The system of claim 9, wherein the data stream is selected from the group consisting of audio data, video data, program data, JPEG Data, HTML data, and MIDI data.

13. The system of claim 9, wherein the one or more payloads includes a media packet that includes a portion of an Advanced Systems Format (ASF) data stream, an ASF packet header, and at least one ASF payload header; and
wherein each single media packet includes a Real-Time Transport Protocol (RTP) packet header, one RTP payload format header, and a portion of a RTP data stream.

14. The system of claim 9, wherein:
the payload profile format header includes a fixed length portion and a variable length portion; and
the variable length portion includes attributes of the corresponding payload.

15. The system of claim 9, further comprising extracting, for each Real-Time Transport Protocol (RTP) payload:
assembling a plurality of portions of one of the media data types into a contiguous payload, wherein the RTP payload includes the plurality of portions;
assembling one portion of one of the media data types into a contiguous payload, wherein the RTP payload includes one portion of the media data types; and
assembling all of the fragments of the one portion of one of the media data types into a contiguous payload, wherein the RTP payload includes a fragment of one portion of one of the media data types.

* * * * *